(12) United States Patent
Hwang et al.

(10) Patent No.: US 7,587,063 B2
(45) Date of Patent: Sep. 8, 2009

(54) ASYMMETRIC SUBSPACE WATERMARKING

(75) Inventors: Wen-Liang Hwang, Taipei (TW); Jeng-Nan Tzeng, Taipei (TW); I-Liang Chern, Taipei (TW)

(73) Assignee: Academia Sinica, Taipei (TW)

( * ) Notice: Subject to any disclaimer, the term of this patent is extended or adjusted under 35 U.S.C. 154(b) by 717 days.

(21) Appl. No.: 11/355,013

(22) Filed: Feb. 16, 2006

(65) Prior Publication Data
US 2007/0025590 A1 Feb. 1, 2007

(51) Int. Cl.
*G06K 9/00* (2006.01)

(52) U.S. Cl. ........................................ 382/100

(58) Field of Classification Search ............... 382/100, 382/296, 298, 137, 232; 705/51, 57; 375/242
See application file for complete search history.

(56) References Cited

U.S. PATENT DOCUMENTS 6,614,914 B1 * 9/2003 Rhoads et al. ............. 382/100
6,671,386 B1 * 12/2003 Shimizu et al. ............. 382/100
2001/0016052 A1 * 8/2001 Miller ........................ 382/100

* cited by examiner

*Primary Examiner*—Matthew C Bella
*Assistant Examiner*—Claire Wang
(74) *Attorney, Agent, or Firm*—Bacon & Thomas, PLLC

(57) ABSTRACT

According to an asymmetric watermarking technology, which is particularly resistant to projection attack, an original image is analyzed to obtain its watermarking space. The watermarking space is then divided to obtain two orthogonal subspaces g and h. An embedding key G, which is a matrix and which columns form bases of subspace g, is selected and a matrix H, $H^T G=0$ is calculated. Columns of matrix H form bases of subspace h. A detecting key D, which equals the sum $D=G^{T=BH^T}$, wherein B is a matrix, is calculated, and a watermark w is obtained and embedded into the original image $\phi_0$ to obtain a watermarked image $\phi_w=\phi_0+Gw$, wherein $D\phi_0=m_0$ is not a 0 vector.

15 Claims, 6 Drawing Sheets

| Number | Method | sim mean | sim std |
|---|---|---|---|
| 1 | shift | 0.987 | 0.244 |
| 2 | blur | 0.999 | 0.001 |
| 3 | JPEG | 0.998 | 0.002 |
| 4 | sharpen | 0.999 | 0.002 |
| 5 | rotation ($\pm 5^0$) | 0.957 | 0085 |
| 6 | StirMark | 0.984 | 0.030 |
| 7 | combinations | 0.934 | 0.092 |

ASYMMETRIC SUBSPACE WATERMARKING

FIELD OF THE INVENTION

The present invention relates to an asymmetric watermarking technology, especially to a method and device for embedding a digital watermark into a data file and to generate detection key for said watermark.

BACKGROUND OF THE INVENTION

Digital security information embedded in digital content, called watermarking, has many applications, including authentication, copyright protection, copy protection, fingerprinting, and broadcasting channel tracking. Among them, copy protection is one of the most desired applications for watermarking technology. Copy protection should not be confused with copyright protection because, for the former, one key is given to all recipients, while for copyright protection; each image has its own key.

In a symmetric watermarking system, the key used to embed a watermark and the key used to extract a watermark are identical and are kept confidential. This common secret key is a random sequence, which is embedded in a digital image by the spreading spectrum technique. Notable security problems of the symmetric watermarking approach raised from the need of disclosing the secret key to owners and legitimate recipients, as well as from the need to identify the image file that a particular secret key is associated with, especially when the image file belongs to a large image database. This gives invaders a chance to understand content of the secret key. Another problem came from the application side. The watermark serves as evidence of ownership. For attackers, may easily follow the why how the watermark is embedded to remove a forged watermark from the file, whereby the embedded watermark can not be detected using the secret key.

In order to solve these problems, a "zero-knowledge watermark detection" technology was proposed. The basic idea of zero-knowledge watermark detection is to replace the watermark detection process with a cryptographic protocol. Although this approach shows promise, it requires a great deal of bidirectional communications between owners and verifiers to prove ownership of copyright.

Asymmetric watermarking is another approach to solve the above-mentioned problems. An asymmetric watermarking system uses two sets of keys: one for embedding, and the other for detection. The detecting key is made available to the public so that anyone may access to it and is permitted to use it to verify particular watermark from a digital image. The public key of each watermarked image is usually stored in a safe place where a trusted third party can verify its integrity to avoid that anyone could produce a valid public key by one's own asymmetric watermarking method. The public key is open and is easy to verify and to authenticate. In the asymmetric system, the secret embedding keys are not used for verification. Therefore, no secret information is transmitted over the channel, nor can it be accessed in the database.

One important feature of the asymmetric system rests in that it is almost impossible, or at least computationally impossible, for those who know the entire system, except for the secret key, to successfully hack into the system. Some interesting asymmetric schemes have been proposed for watermarking. However, till 2003, researchers still believed that asymmetric watermarking systems suited for commercial use could not exist. See T. Furon and P. Duhamel, "An asymmetric watermarking method," *IEEE Trans. Signal Processing*, vol. 51, no. 4, pp. 981-995, April 2003. The asymmetric watermarking methods ever proposed were for copy protection purposes and their watermark detector must be embedded into detection devices, so that inverting the embedding process becomes computationally difficult.

A closest point attack (or projection attack when the detection method is linear) tries to find the forged image that is closest to the watermarked image and this forged image does not detect any watermark. After the projection attack, an image that does not contain the embedded watermark, or contains residual information from where the embedded watermark may not be detected, will be obtained. In the conventional art, there is no watermarking technology that is resistant to closest point attack.

OBJECTIVES OF THE INVENTION

The objective of this invention is to provide an asymmetric watermarking method that is suited in copyright protection.

Another objective of this invention is to provide an asymmetric watermarking technology whereby all information, except the secret key, may be released to the public.

Another objective of this invention is to provide an asymmetric watermarking technology that is resistant to invasion.

Another objective of this invention is to provide an asymmetric watermarking technology whereby the embedded watermark is resistant to attacks.

Another objective of this invention is to provide an asymmetric watermarking technology that is in particular resistant to closest point attack.

SUMMARY OF THE INVENTION

According to this invention, an asymmetric watermarking method is provided. The invented asymmetric watermarking technology is particularly resistant to projection attack that the conventional art may not overcome. The invented method comprises the following steps:

Analyze an feature of the original image $\phi_o$ to obtain its watermarking space W.

Divide said watermarking space W to obtain two orthogonal subspaces g and h.

Select an embedding key G, which is an orthogonal matrix and which columns form bases of subspace g.

Calculate a matrix H, $H^T G = 0$. Columns of matrix H form bases of subspace h.

Calculate detecting key D:

$$D = G^T + BH^T;$$

where B is a matrix, its general form is as the following:

$$B = \frac{(1-\lambda)}{\|s\|^2} st^T + \sum_{i,j} c_{i,j} u_i v_j^T,$$

where s is the projection component of $\phi_o$ in subspace g, t is the projection component of $\phi_o$ in subspace h, $$\lambda = 1 + \frac{\|s\|^2}{\|t\|^2},$$

$u_i \perp s$, $v_j \perp t$ and $c_{i,j}$ is a real number.

Obtain a watermark w and embed said watermark w into said feature of original image $\phi_o$ to obtain a feature of watermarked image $\phi_w$, as follows:

$$\phi_w = \phi_o + Gw,$$

where $D\phi_o = m_o$ is not a 0 vector. If copy protection is considered, preferably, watermark w is parallel with $m_o$.

These and other objectives and advantages of this invention may be clearly understood from the detailed description by referring to the following drawings.

DETAILED DESCRIPTION OF THE INVENTION

Symmetric Watermarking

In a previous study disclosed by the inventors of this invention, a symmetric watermarking technology was proposed. According to this symmetric watermarking technology, a robust subspace watermarking method was introduced. A subspace W may be found from the space defined by features of a digital image to embed the watermark, whereby the watermark is resistant to conventional image operations. The subspace was called "watermark space" and the proposed symmetric watermarking technology was proved to be effective. According to the symmetric watermarking technology, the feature space F of the digital image space may be divided into two subspaces, W and V. The column vectors of the secret matrices G form an orthogonal basis of subspaces W. The watermark w is embedded into subspace W by the secret matrix G, while our watermark detection method uses a publicly released matrix $G^T$, whose domain is W. I.e., $D = G^T$.

Under this technology, a pirate can obtain knowledge of the watermark space but cannot obtain the basis of the space used to form G. See: J. Tzeng, W. L. Hwang, and I. Liang Chern, "Enhancing image watermarking methods with/without reference images by optimization on second order statistics," IEEE Trans. Image Processing, vol. 11, pp. 771-782, July 2002.

Figure 1:
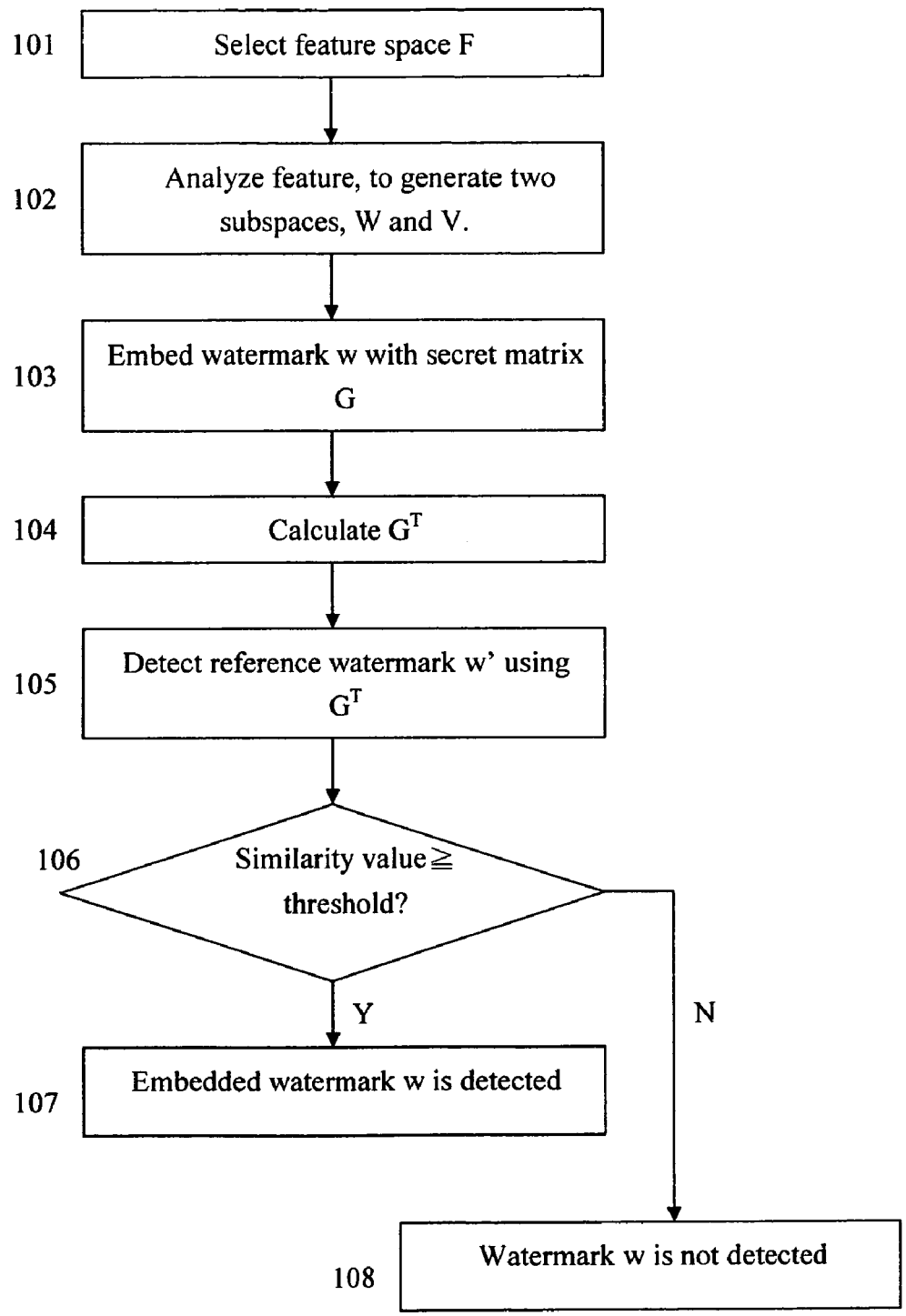
FIG. 1 illustrates the flowchart of the symmetric watermarking method previously disclosed by the inventor.
Figure 2:
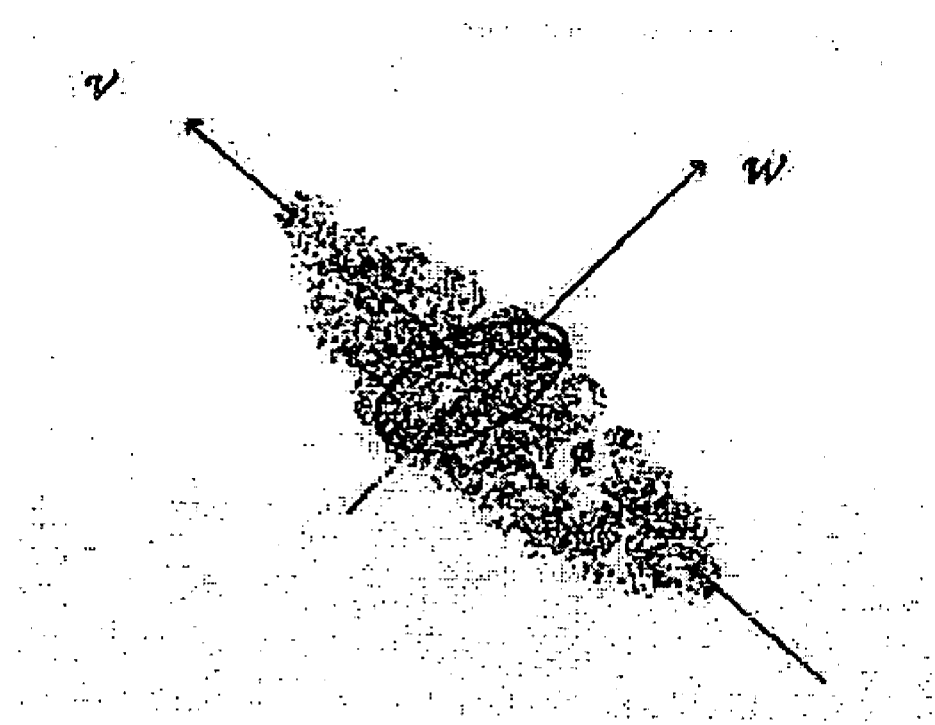
FIG. 2 shows the simplified schematic diagram of the subspace watermarking technology.

FIG. 1 illustrates the flowchart of the symmetric watermarking method previously disclosed by the inventor. As shown in this figure, to embed a watermark into a digital image, first at 101 features of the image are extracted in the conventional feature space using any available method. The features may be extracted using DCT transform, wavelet transform etc. Then at 102 forged modifications are attempted to the digital image to obtain distribution of features of the forged images brought by possible image processing. The distribution of the forged images is analyzed by any feature canalization tool, such as singular value decomposition (SVD). According to the processing of SVD, a subspace suited for embedding or hiding a robust watermark may be obtained, called "watermark space". In practice, SVD processing will generate two subspaces, W and V, as shown in FIG. 2. FIG. 2 shows the simplified schematic diagram of the subspace watermarking technology. In this figure, distribution of the forged modifications of the watermarked image is plotted. Components with smaller spectrum after applying SVD to the distribution form the watermark space W, while components of greater spectrum form subspace V.

At 103 a watermark w is embedded into the watermark space W. Although it is not intended to limit this invention by any theory, the reason why subspace W was chosen was because the watermark space W is least affected by most modifications made to the digital image. The orthogonal complement of W is denoted as V, representing the subspace that is most susceptible to modifications brought to the digital image. This approach allows a copyright owner to custom select the watermark space that is most resistant to possible attacks.

Let $\phi_0$ be the feature of the original image. Watermark w is embedded into W by:

$$\phi_w = \phi_o + Gw,$$

where G is a secret matrix whose columns are a basis of W, and $\phi_w$ is the feature of the watermarked image. Because watermark w is in W, the watermark is robust against possible attacks.

A pirate can simulate attacks on the watermarked image and obtain a good approximation of space W, but the pirate cannot obtain the secret matrix G from the space.

In this symmetric watermarking technology, the secret key G is used to embed the watermark and its inverse $G^T$ is used to extract the embedded watermark. At 104 inverse $G^T$ of G is calculated and at 105 a reference watermark w' is detected using $G^T$, as follows:

$$w' = G^T(\phi_e + \phi_0)$$

At 106 similarity between w and w' is calculated. If the similarity value is greater than a threshold, determine that the watermarked image contains the embedded watermark w at 107. Otherwise, determine that the watermarked image does not contain the embedded watermark w at 108.

The above symmetric watermarking method does not need a reference image to detect the embedded watermark. Because the key is content-dependent, when the number of watermarked images is large, there are problems that copyright owners need to manage so that the correct key of a particular watermarked image can be located. It is also necessary to secretly transmit the keys to other parties. Contrast to this, in an asymmetric watermarking method, a verifier does not need an exclusive permission to access to the published key database. This reduces efforts in the key management. In addition, anyone can prove copyright of a watermarked image without the need of transmitting the secret key.

Asymmetric Watermarking

In the asymmetric watermarking technology of this invention, the watermark is embedded into the digital image in a manner based on the above-mentioned symmetric subspace watermarking method. On the other hand, in detecting the embedded watermark, a public detection key is additionally design. The public key is made available to related parties along with its detection method and the watermarked content, without secrecy. The secret key of this invention can not be obtained based on information related to the public key or the image itself. In addition, if a third party uses any attack to simulate the secret key or to obtain a key similar to the secret key, removing the watermark from the watermarked image still can not be realized. The invented watermarking technology is particularly resistant to projection attack, which the conventional art may not overcome. The invented asymmetric watermarking technology will be described in details in the followings.

Figure 3:
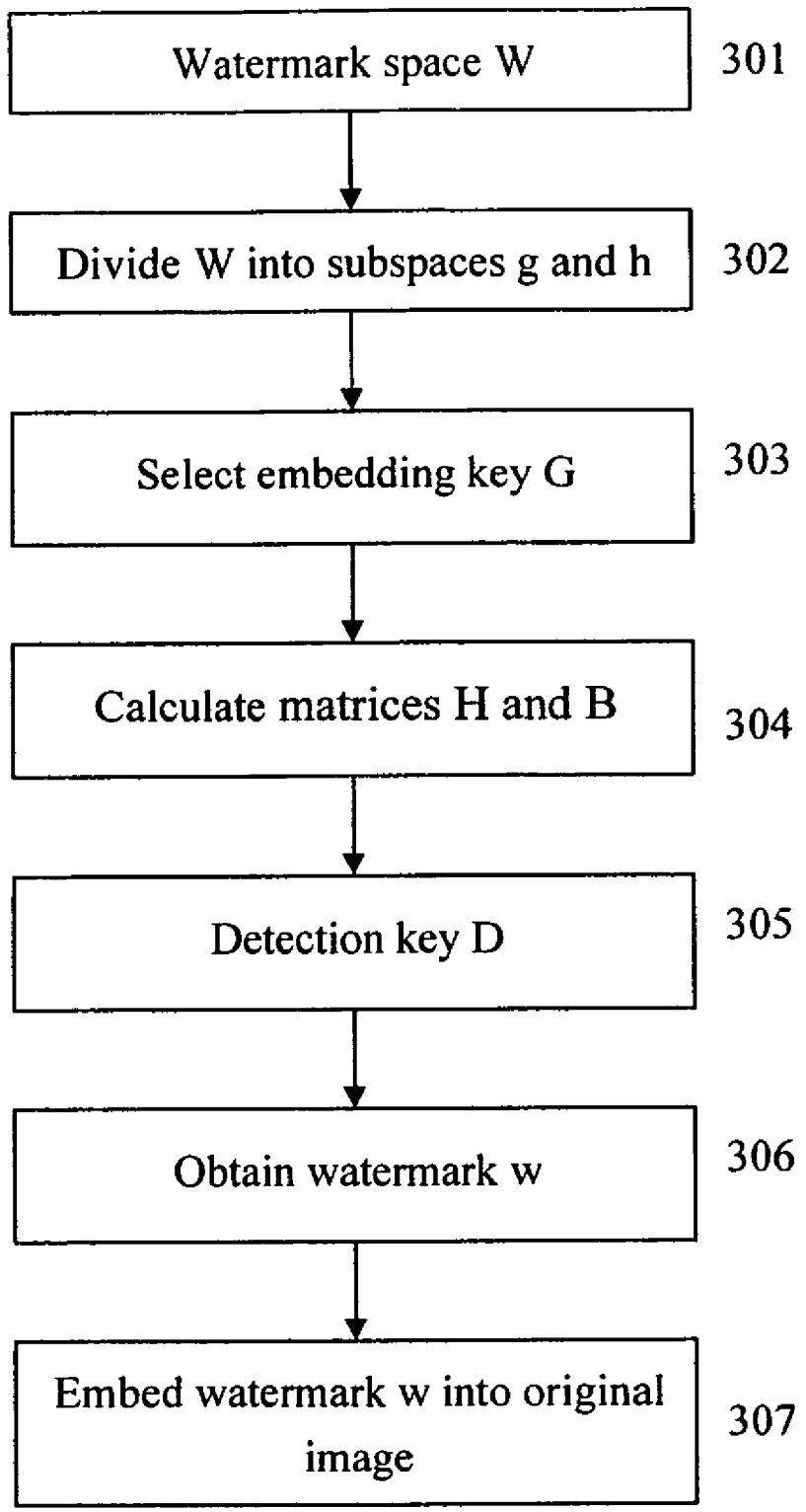
FIG. 3 illustrates the flowchart of the asymmetric watermarking method of this invention.

FIG. 3 illustrates the flowchart of the asymmetric watermarking method of this invention. As shown in this figure, at 301 a feature of digital image $\phi_0$ is analyzed to obtain its watermark space W. In allocating the watermark space, the watermark space allocation method disclosed in the above-mentioned symmetric watermarking technology may be used. Other methods, such as DCT transform and other known art may also be used.

At 302 the watermark space W is further divided into two orthogonal subspaces g and h. At 303 an embedding key G is selected. G is a matrix whose columns form a basis of subspace g. At 304, matrix H satisfies $H^T G=0$. H's columns form a basis of subspace h. At 305 detection key D is calculated. D is weighted mixing of matrices G and H, as follows:

$$D = G^T + BH^T,$$

where B is a matrix, its general form is as the following:

$$B = \frac{(1-\lambda)}{\|s\|^2} st^T + \sum_{i,j} c_{i,j} u_i v_j^T,$$

where s is the projection component of $\phi_o$ in subspace g, t is the projection component of $\phi_o$ in subspace h, $$\lambda = 1 + \frac{\|s\|^2}{\|t\|^2},$$

$u_i \perp s$, $v_j \perp t$ and $c_{i,j}$ is a real number.

Finally at 306, watermark w is obtained and at 307 watermark w is embedded into the original image $\phi_o$ to obtain the watermarked image $\phi_w$, as follows:

$$\phi_w = \phi_0 + G_w,$$

where $D\phi_0 = m_0$ is not a zero vector, so to avoid spying or removal of the embedded watermark. In addition, w is preferably parallel to $m_0$, so that feature information of the image may be used to overcome projection attack. In other embodiments, $m_0$ is not parallel to w.

In the application, the public key D may be disclosed to the public along with the embedded watermark w. They may also be provided after having been mixed with an orthogonal matrix Q, as (QD, Qw).

When detecting the embedded watermark, a test image T is obtained. The purpose of the detection is to determine whether the test image contains the watermark w. Features of the test image T are extracted following the same or similar method in embedding the watermark w. Feature image $\phi_e$ of the test image is thus obtained. The feature image $\phi_e$ is multiplied by the detection key D to obtain a vector $D\phi_e$. If the test image T contains the watermark w, $D\phi_e$ is in ratio to the watermark w. Calculate the similarity between vector $D\phi_e$ and watermark w and whether watermark is contained in the test image T may be determined. Since detection and comparison belong to the known art, detailed description thereof is omitted.

EMBODIMENT

Figure 4:
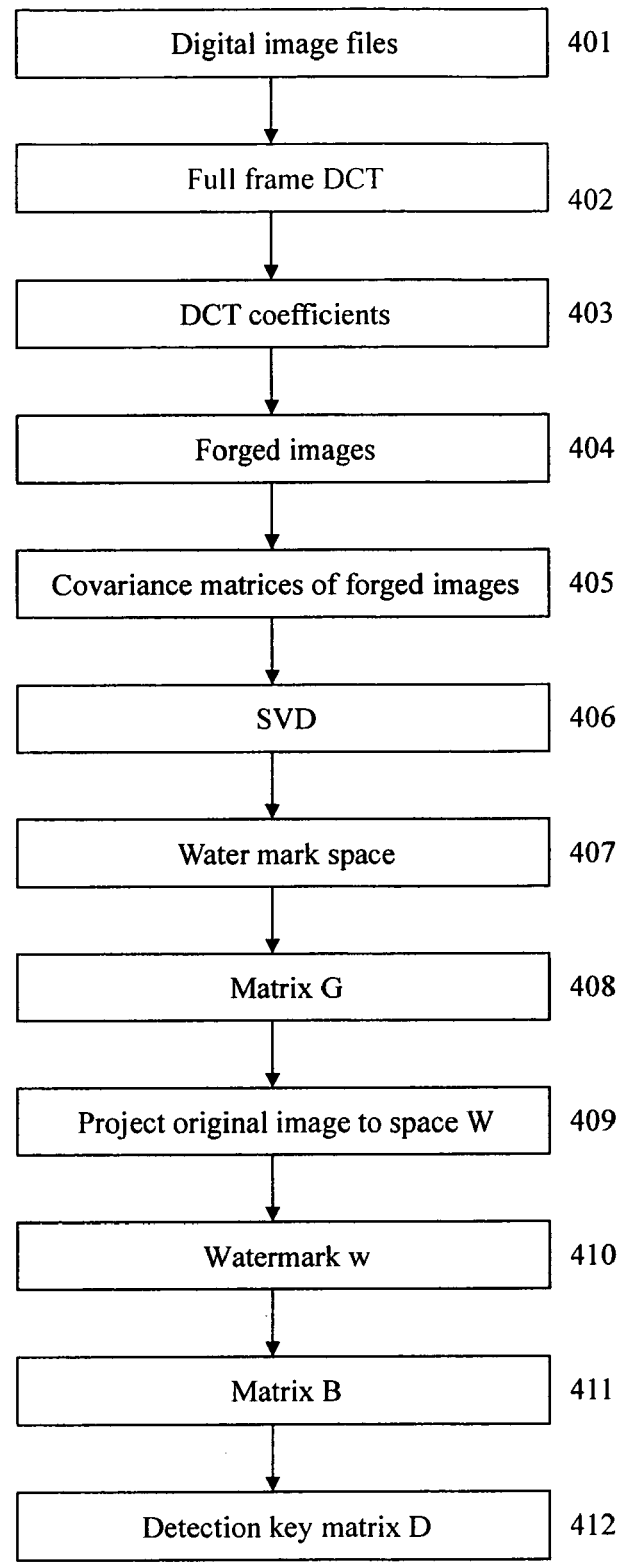
FIG. 4 illustrates the flowchart of an embodiment of the asymmetric watermarking method of this invention.

An embodiment of the asymmetric watermarking method of this invention will be described hereinafter. FIG. 4 shows the flowchart of an embodiment of the asymmetric watermarking method of this invention. As shown at 401 in this figure, 61 digital image files are obtained. Their size ranged from 223 by 342 pixels to 512 by 512 pixels. At 402, use the full frame DCT to each image, then at 403 select DCT coefficients from their upper left 32 by 32 corners to form their feature images. The coefficients corresponded to 32 horizontal low-frequency bands and 32 vertical low-frequency bands. Thus, the obtained feature space had a dimension of 1024 frequency bands.

At 404, we generate from each image a set of 100 forged images by means of image processing. Processing included: blurring (with B-spline kernel), JPEG compression, scaling, rotations (with $-5° \leq \theta \leq 5°$), translations (by shifting at most ten pixels either up, down, to left or to right), adding random noise, stirmark, various image operations from the Matlab image toolbox, as well as combinations of all these operations. At 405, the covariance matrix of each image is calculated from features collected from the forged images. At 406, process the covariance matrices using SVD. At 407, watermark space is chosen from the space spanned by 900 orthonormal vectors (of the covariance matrix) where corresponding spectrums were relatively small.

Let W be the matrix of the 900 orthonormal vectors and $\phi_0$ be the feature of the original image. At 408, from an orthogonal basis of W space, randomly choose 100 vectors as orthogonal basis of g and form columns of the secret matrix G. The remaining vectors form columns of the secret matrix H.

At 409, $\phi_0$ is projected to space W to obtain and obtain $\psi_0$, which is represented by $\psi_0 = Gs + Ht$, where s and t are coefficients of $\psi_0$ in subspaces g and h, respectively. At 410, watermark w is chosen to be parallel to s. Let, w=ks where k is a scalar. In order to have a higher SNR of our watermark signal w to $\phi_0$, k is preferably be as large as possible. However, k cannot be too great to decrease the perceptual quality of the watermarked image.

At 411, matrix B is calculated according to the following formula:

$$B = \frac{1-\lambda}{\|s\|^2} st^T + \sum_{i,j} c_{i,j} u_i v_j^T,$$

where $$\lambda = 1 + \frac{\|s\|^2}{\|t\|^2},$$

$u_i \perp s$, $v_j \perp t$, and $c_{ij}$ is a real number. Value of $c_{ij}$ may be randomly selected from $[-c, c]$ and the constant c will effect the false alarm of this technique. In practical, c=1 is a good choice. At 412, detection key matrix D is calculated according to matrix B, as follows:

$$D = G^T + BH^T.$$

The watermark so obtained from the above steps is robust and resistant to all kinds of attack. Acquiring the secret key by tracing from information relating to he public is almost impossible. Even if a third party uses a matrix that is close to the secret key to remove the watermark, the image would be damaged and all these efforts go in vain. On the other hand, the detection key of this invention produces relatively high success rate in detecting the embedded watermark.

Robustness Assessment

The following simulation of copy attack is performed. Obtain a noise image by subtracting the watermarked Lena image from a denoised image. Then extract an estimated feature of the watermark from the image. The estimated feature is embedded into each non-Lena image. After applying Lena's detection matrix to each image, compared the result. The mean and standard deviation of 60 copy attacks were 0.0346 and 0.0287, respectively. Proved that this invention is resistant to copy attacks.

Figures 5, 6:
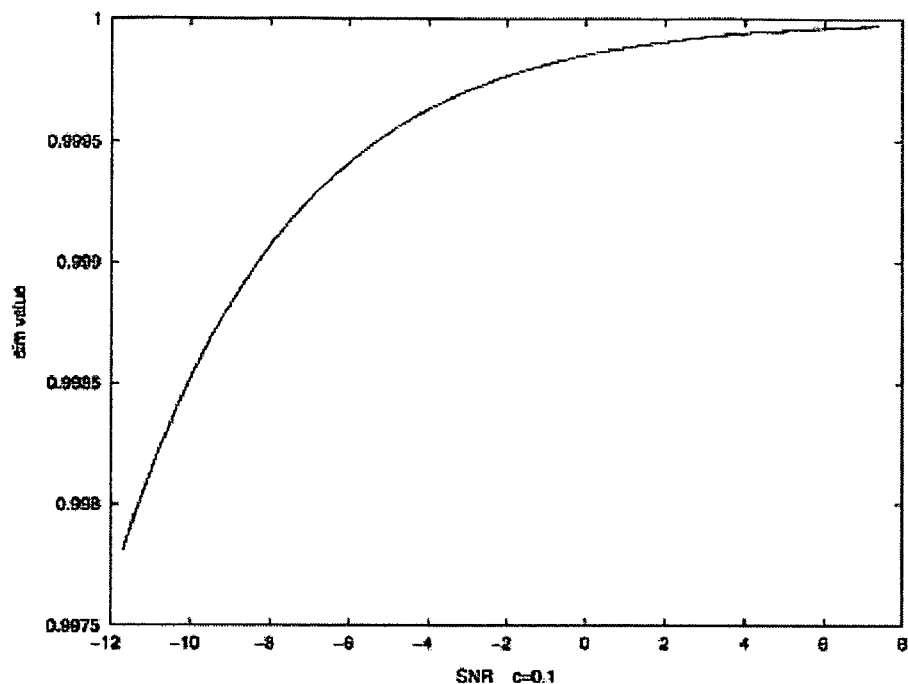
FIG. 5 shows the performance of the invented public key under random noise attack.
FIG. 6 shows values of mean and standard deviation of various attacks on the watermarked image.

Use simulation attack to find the watermark space of a watermarked Lena image. Random noises are embedded into the image. Detect the watermark using the invented public key. Performance results for this attack are shown in FIG. 5. In this figure, the horizontal axis represents signal to noise rate (SNR) and the vertical axis represents sim value. It is observed from the figure that even at a very low SNR, the detection value is still quite high.

Blind attacks are carried out with the intention of removing a watermark from a digital image when the attacker has no knowledge of the watermarking method. These attacks included: shifting, blurring, JPEG compression, sharpening, rotation, stirmarking, as well as combinations of the above attacks. The obtained images are detected using the public key of this invention. Results are shown in FIG. 6. FIG. 6 shows values of mean and standard deviation of various attacks on the watermarked image. Although the rotation attack (i.e., rotating the watermarked image without rotating it back) has a slightly lower detection value, the invented detection key is still robust against these attacks.

Security Assessment

The oracle attack estimates the secret key from the detection process by observing the detector outputs. The secrete key so obtained may be used to remove the embedded watermark. In this invention, the public key $D=G^T+BH^T$ is open information. An attacker may acquire the knowledge of $D=G^T+BH^T$ from value of D and the formula. But Gw remains unknown to the attacker.

Figure 7:
FIG. 7 shows result of projection attack made to a watermarked Lena image.

A closest point attack (projection attack) tries to find the feature image that is closest to the watermark and to subtract the closest watermark from the image. The result of projection attack may generate an image that does not contain the watermark or an image from which the embedded watermark may not be detected. However, due to the special design of the public key matrix D, removing the watermark would lead to the result of damaging the image. FIG. 7 shows result of projection attack made to a watermarked Lena image. The PSNR was 17 dB. It is proved that the asymmetric watermarking technology of this invention is able to overcome projection attacks.

As the present invention has been shown and described with reference to preferred embodiments thereof, those skilled in the art will recognize that the above and other changes may be made therein without departing form the spirit and scope of the invention.

What is claimed is:

1. Method for embedding a watermark into a digital image and for generating a key to detect said embedded watermark, comprising the following steps:

obtaining feature vector matrix $\phi_0$ from an original digital image;

analyzing said feature vector matrix $\phi_0$ to obtain its watermarking space W;

dividing said watermarking space W to obtain two orthogonal subspaces g and h;

selecting an embedding key G, which is a matrix and which columns form bases of said subspace g;

calculating a matrix H, $H^T G=0$; wherein columns of said matrix H form bases of said subspace h;

calculating detecting key D by weighted mixing said matrices G and H.

2. The method according to claim 1, wherein said detection key is calculated according to the following formula:

$$D=G^T+BH^T; \text{ wherein B is a matrix.}$$

3. The method according to claim 1, further comprising the steps of obtaining a watermark w and embedding said watermark w into said feature vector matrix $\phi_0$ to obtain a watermarked image $\phi_w$, as follows:

$$\phi_w=\phi_0+Gw;$$

wherein $D\phi_0=m_0$ is not a 0 vector.

4. The method according to claim 1, wherein said watermark space comprises subspace obtained from analysis of feature distribution of said feature vector matrix $\phi_0$.

5. The method according to claim 1, wherein said watermark space comprises subspace obtained from analysis of distribution of possible attacks made to said feature vector matrix $\phi_0$ and consisted of vectors representing low possibilities of distribution of possible attacks made to said feature vector matrix $\phi_0$.

6. The method according to claim 5, wherein said watermark space comprises subspace obtained from analysis of distribution of possible attacks made to said feature vector matrix $\phi_0$ using SVD (singular value decomposition) and consisted of vectors representing low spectrum elements generated from said SVD analysis.

7. The method according to claim 1, wherein generating of said watermark space W comprises the seteps of:

generating a plurality of forged images from image processing of said feature vector matrix $\phi_0$;

collecting features of said plurality of forged images and calculating covariance matrix of each image; and obtaining watermark space from the space spanned by relatively small spectrum.

8. The method according to claim 7, further comprising a step of processing said covariance matrices using SVD.

9. The method according to claim 2, further comprising the steps of obtaining a watermark w and embedding said watermark w into said feature vector matrix $\phi_0$ to obtain a watermarked image $\phi_w$, as follows:

$$\phi_w=\phi_0+Gw;$$

wherein $D\phi_0=m_0$ is not a 0 vector.

10. The method according to claim 2, wherein said watermark space comprises subspace obtained from analysis of feature distribution of said feature vector matrix $\phi_0$.

11. The method according to claim 2, wherein said watermark space comprises subspace obtained from analysis of distribution of possible attacks made to said feature vector matrix $\phi_0$ and consisted of vectors representing low possibilities of distribution of possible attacks made to said feature vector matrix $\phi_0$.

12. The method according to claim 11, wherein said watermark space comprises subspace obtained from analysis of distribution of possible attacks made to said feature vector matrix $\phi_0$ using SVD (singular value decomposition) and consisted of vectors representing low spectrum elements generated from said SVD analysis.

13. The method according to claim 2, wherein generating of said watermark space W comprises the steps of:
- generating a plurality of forged images from image processing of said feature vector matrix $\phi_0$;
- collecting features of said plurality of forged images and calculating covariance matrix of each image; and
- obtaining water mark space from the space spanned by relatively small eigenvalues.

14. The method according to claim 13, further comprising a step of processing said covariance matrices using SVD.

15. The method according to claim 2, wherein matrix B is calculated according to the following formula:

$$B = \frac{1-\lambda}{\|s\|^2} st^T + \sum_{i,j} c_{i,j} u_i v_j^T;$$

wherein $$\lambda = \left(1 + \frac{\|s\|^2}{\|t\|^2}\right),$$

$u_i \perp s$, $v_j \perp t$, $c_{i,j}$ is a real number, and Value of $c_{ij}$ is randomly selected from $[-c, c]$, c is a constant.

* * * * *

UNITED STATES PATENT AND TRADEMARK OFFICE
CERTIFICATE OF CORRECTION

PATENT NO. : 7,587,063 B2  Page 1 of 1
APPLICATION NO. : 11/355013
DATED : September 8, 2009
INVENTOR(S) : Hwang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 876 days.

Signed and Sealed this

Twenty-first Day of September, 2010

David J. Kappos
*Director of the United States Patent and Trademark Office*